(12) United States Patent
Chou

(10) Patent No.: US 6,476,618 B1
(45) Date of Patent: Nov. 5, 2002

(54) CIRCUIT FOR INDICATING ABNORMALITY OF THREE-MODE SURGE ABSORBER OF PUBLIC ELECTRIC POWER

(76) Inventor: Jonie Chou, 9F-4, No. 232, Chung Ho Road, Chung Ho City, Taipei Hsien (TW)

( * ) Notice: Subject to any disclaimer, the term of this patent is extended or adjusted under 35 U.S.C. 154(b) by 48 days.

(21) Appl. No.: 09/717,344

(22) Filed: Nov. 22, 2000

(30) Foreign Application Priority Data

Nov. 6, 2000 (TW) .................................... 89219211 U

(51) Int. Cl.⁷ .............................................. G01R 31/02
(52) U.S. Cl. ...................................... 324/550; 324/509
(58) Field of Search ................................ 324/550, 509; 361/56, 103, 111, 117

(56) References Cited

U.S. PATENT DOCUMENTS 5,299,088 A * 3/1994 Honi et al. .................. 361/119
6,166,458 A * 12/2000 Redburn et al. ............ 307/105

* cited by examiner

Primary Examiner—N. Le
Assistant Examiner—Etienne P LeRoux
(74) Attorney, Agent, or Firm—Troxell Law Office PLLC

(57) ABSTRACT

A circuit for indicating abnormality of a three-mode surge absorber of a public electric power is disclosed. The circuit is serially connected between the input end and output end of a public electric power supply for indicating the abnormality of a three-mode surge absorbing device of a public power supply. The circuit includes a first fuse, a first surge absorbing device, an abnormal indication circuit, a second surge absorbing device and a second fuse. Other than indicating the abnormality of the L-N, L-G, N-G surge absorbing devices, the present invention can prevent current leakage in above devices.

6 Claims, 2 Drawing Sheets

CIRCUIT FOR INDICATING ABNORMALITY OF THREE-MODE SURGE ABSORBER OF PUBLIC ELECTRIC POWER

FIELD OF THE INVENTION

The present invention relates to a power abnormality indicating circuit, and especially to circuit for indicating abnormality of a three-mode surge absorber of a public electric power. Other than indicating the abnormality of the L-N, L-G, N-G surge absorbing devices, the present invention can prevent current leakage as destroys occurs in above modes.

BACKGROUND OF THE INVENTION

The general power receptacles for surge protection use metal oxide varistors or other transient/surge absorbers for suppressing surge wave. These elements will heat as absorbing surge wave, even a large surge wave will induce a short circuit. Therefore, temperature fuses or current fuses are used to prevent abnormality.

In general, the cutting-off of fuses is used to determine the abnormality of a surge protection indicator. However, in order to prevent that the leakage current to the ground is too large, in general, the indicator only displays the condition of the input ends of line-neutral mode while the conditions of line-ground mode and neutral-ground mode are not displayed.

Referring to FIG. 1, a prior art circuit for indicating abnormality of a surge absorber is illustrated, which includes two surge absorbing devices 10 and 30 and an abnormal indication circuit 20. The L-N end in the three-mode in public power supply is connected to the surge absorbing device 10 in series. The surge absorbing device 30 is serially connected between the L-G and N-G ends. The surge absorbing device 10 has a two-end temperature sensing fuse 101 capable of suffering from a temperature of 139° C. and a metal oxide varistor 102. When the metal oxide varistor 102 has abnormality, it will heat gradually. Since it tightly resists against the two-end temperature sensing fuse 101, the metal oxide varistor 102 will heat and finally burn-cut the two-end temperature sensing fuse 101 so that the surge protection indicator D2 will extinguish due to no current flowing therethrough.

The surge absorbing device 30 has two metal oxide varistors 301 and 302 and a two-end temperature sensing fuse 303 capable of suffering from a temperature of 139° C. When the metal oxide varistor 301 has abnormality, it will heat gradually. Since it tightly resists against the two-end temperature sensing fuse 303, the metal oxide varistor 301 will heat and finally burn-cut the two-end temperature sensing fuse 303, but the two-end temperature sensing fuse 101 does not burn-cut so that the surge protection indicator D2 will not extinguish. Namely, the fault of the surge absorbing device 30 of the L-G ends can not be detected. Furthermore, When the metal oxide varistor 302 has abnormality, it will heat gradually. Since it tightly resists against the two-end temperature sensing fuse 303, the metal oxide varistor 302 will heat and finally burn-cut the two-end temperature sensing fuse 303, but the two-end temperature sensing fuse 101 does not burn-cut so that the surge protection indicator D2 will not extinguish. Namely, the fault of the surge absorbing device 30 of the N-G ends can not be detected.

SUMMARY OF THE INVENTION

Accordingly, the primary object of the present invention is to provide a circuit for indicating abnormality of a three-mode surge absorber and a multiple-end fuse.

To achieve above objects, the present invention provides a circuit for indicating abnormality of a three-mode surge absorber of a public electric power serially connected to an input end and an output end of a public power supply, the circuit for indicating abnormality of a three-mode surge absorber of a public electric power comprising: a first two-end fuse having a first end coupled to the line input end; a first surge absorbing device coupled to a second end of the first two-end fuse and the neutral input end for absorbing a surge between the line input end and the neutral input end; a second surge absorbing device coupled to the line input end and the neutral input end for absorbing a surge between the neutral input end and ground input end; an abnormal indication circuit coupled to the first surge absorbing device, the second surge absorbing device and the neutral input end for indicating abnormalities in three-mode of a public power supply; and a second two-end fuse having a first end coupled to the second surge absorbing device, and a second end coupled to the ground input end for preventing abnormalities of parts. By the aforesaid circuit, other than indicating the abnormality of the L-N, L-G, N-G surge absorbing devices, the present invention can prevent current leakage as destroys occurs in above modes.

The various objects and advantages of the present invention will be more readily understood from the following detailed description when read in conjunction with the appended drawing.

BRIEF DESCRIPTION OF THE DRAWINGS

The various objects and advantages of the present invention will be more readily understood, from the following detailed description when read in conjunction with the appended drawing, wherein.

DETAILED DESCRIPTION OF THE PREFERRED EMBODIMENTS

Figure 1:
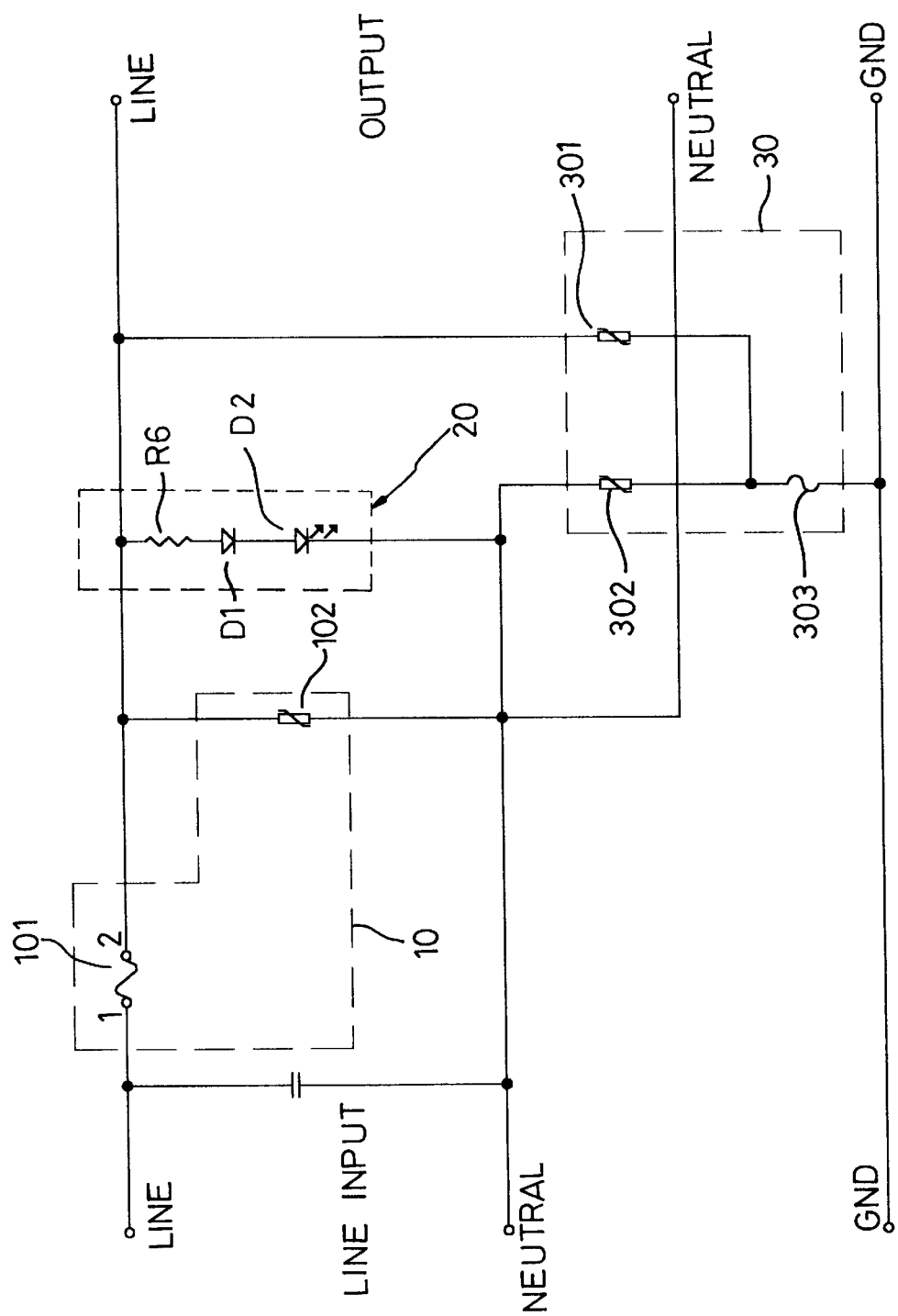
FIG. 1 shows the circuit for indicating abnormality of a surge absorber in the prior art.
Figure 2:
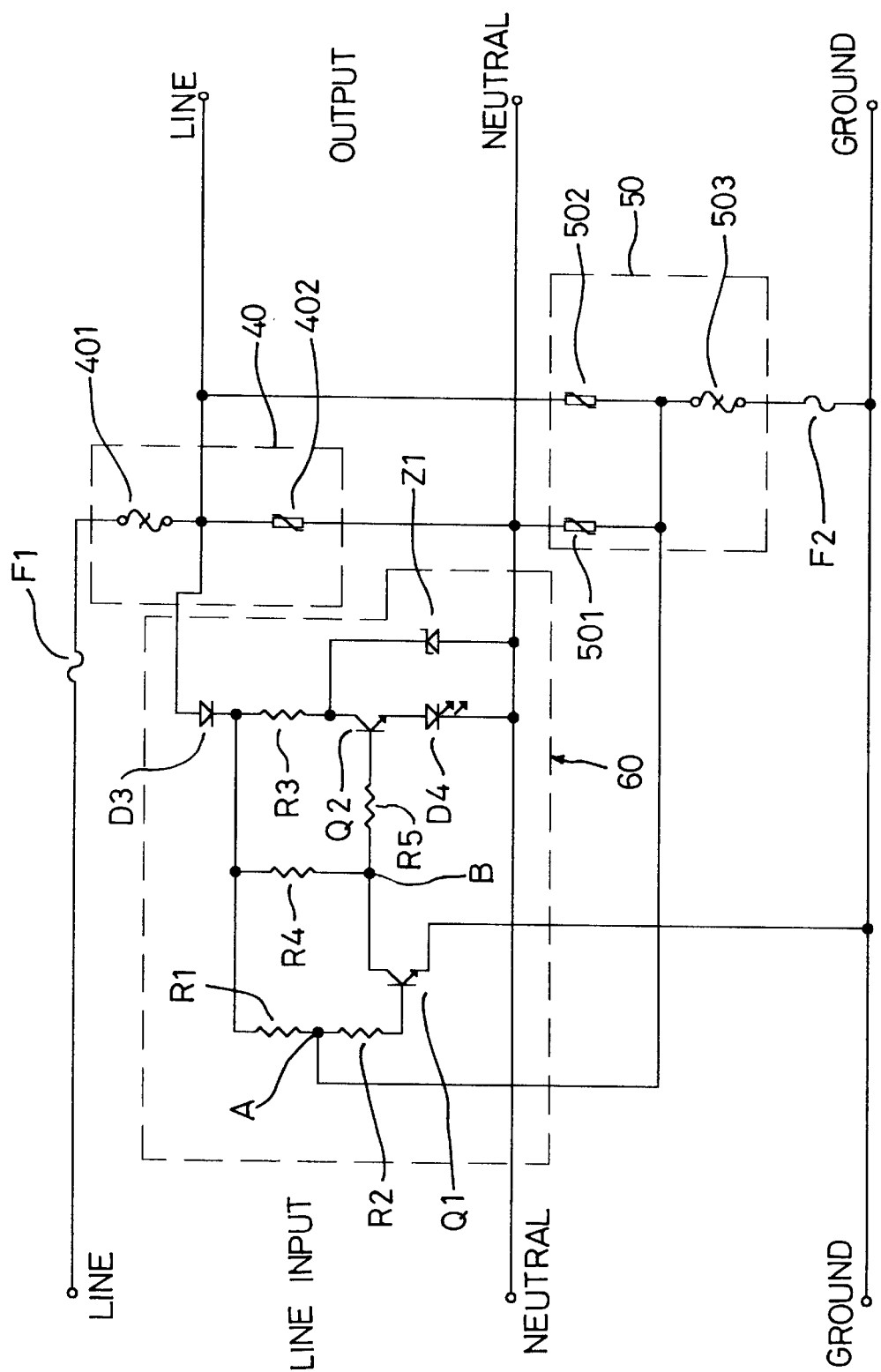
FIG. 2 shows the circuit for indicating abnormality of a three-mode surge absorber of a public electric power in the present invention.

Referring to FIG. 2, the circuit diagram of the circuit for indicating abnormality of a three-mode surge absorber of a public electric power in the preferred embodiment of the present invention is illustrated. The circuit of the present invention includes a first two-end fuse F1, a first surge absorbing device 40, a second surge absorbing device 50, an abnormal indication circuit 60, and a second two-end fuse F2. The first surge absorbing device 40 has a two-end temperature sensing fuse 401 and a metal oxide varistor 402. The second surge absorbing device 50 includes a surge absorbing device 501, the first end thereof is coupled to a line output end, and the second end is coupled to the abnormal indication circuit 60. The first end of the second surge absorbing device 502 is coupled to a line input end, and the second end thereof is coupled to the abnormal indication circuit 60. The two-end temperature sensing fuse 503 has a first end coupled to the second ends of the first and second surge absorbing devices 501 and 502, and has a second end coupled to the first end of the second two-end fuse F2.

The abnormal indication circuit 60 has a diode D3. The anode thereof is coupled to a first surge absorbing device 40. A second end of a first resistor R1 is coupled to the cathode of the diode D3. A second resistor R2 has a first end coupled to a second end of the first resistor R2, and the second surge absorbing device 50 (point A in FIG. 2). A first transistor Q1 has a base coupled to the second end of the second resistor R2, and the emitter thereof is coupled to the ground input end. A third resistor R3 has a first end coupled to the cathode of the diode D3. A fourth resistor R4 has a first end coupled to the first resistor R1, the third resistor R3, and the cathode of the diode D3, and the second end thereof is coupled to the collector of the first transistor Q1 (point B in FIG. 2). A fifth resistor R5 has a first end coupled to a second end of the fourth resistor R4 and the collector of the first transistor Q1. A second transistor Q2 has a base coupled to a second end of the fifth resistor R5, and the collector thereof is coupled to the second end of the third resistor R3. A light emitting diode D4 has a anode coupled to the emitter the second transistor Q2, and the cathode thereof is coupled to the neutral output end. A Zener diode Z1 has a cathode coupled to the collector of the second transistor Q2, and the anode thereof is coupled to the neutral output end for supplying a rated voltage.

The circuit property for the circuit for indicating abnormality of a three-mode surge absorber of a public electric power according to the present invention may be analyzed by the following two modes (1) The transient/surge absorber is heated and then is destroyed gradually, and (2) The transient/surge absorber is subjected to a high voltage instantly and then is destroyed. In the following, the properties of these two modes are analyzed.

(1) The transient/surge absorber is heated and then is destroyed gradually.
   a) L-N mode: the metal oxide varistor 402 is abnormal, and is heated, since it tightly resists against the two-end temperature sensing fuse 401. Finally, the temperature of the metal oxide varistor 402 will burn-cut two-end temperature sensing fuse 401. Therefore, the surge protection indicator D4 has no current and then extinguishes.
   b) L-G mode: the metal oxide varistor 502 has abnormality and then heat gradually, since it resists tightly against the two-end temperature sensing fuse 503, when the two-end temperature sensing fuse 503 is burn-cut so that point A is in a floating condition. When the transistor is conductive, point B is grounded so that transistor Q2 is turned off and the surge protection indicator D4 extinguishes due to no current flowing therethrough.
   c) N-G mode: The metal oxide varistor 501 has abnormality and heats gradually. Since it resists tightly against the two-end temperature sensing fuse 503, when the two-end temperature sensing fuse 503 is burn-cut so that point A is in a floating condition. When the transistor is conductive, point B is grounded so that transistor Q2 is turned off and the surge protection indicator D4 extinguishes due to no current flowing therethrough.

(2) The transient/surge absorber is subjected to a high voltage instantly and then is destroyed.
   a) L-N mode: When abnormality occurs, and high voltage retains, the metal oxide varistor 402 will short-circuit instantly. Since a large current flows into the fuse F1 so that the fuse F1 is heated instantly and then burn-cut. Other than cutting off the current path of the metal oxide varistor 402, the path of the surge protection indicator D4 is also cut off so that the surge protection indicator D4 extinguishes.
   b) L-G mode: When abnormality occurs, and high voltage retains, the metal oxide varistor 502 will short-circuit instantly. Since a large current flows into the fuses F1 and F2, and thus in design, F2 has a smaller current path (or F2 has a small turn-off current than that of F1), so that the fuse F2 is heated instantly and then burn-cut. The current path of the metal oxide varistor 502 is cut off so that point A is in a floating condition and transistor Q1 is conductive, point B is grounded so. that transistor Q2 is turned off. The surge protection indicator D4 extinguishes due to no current flowing therethrough.
   c) N-G mode: When abnormality occurs, and high voltage retains, the metal oxide varistor 501 will short-circuit instantly. Since a large current flows into the fuse F2, so that the fuse F2 is heated instantly and then burn-cut. The current path of the metal oxide varistor 503 is cut off so that point A is in a floating condition and transistor Q1 is conductive, point B is grounded so that transistor Q2 is turned off. The surge protection indicator D4 extinguishes due to no current flowing therethrough.

In summary, other than indicating the abnormalities of the L-N, L-G, N-G surge absorbing devices, the circuit for indicating abnormality of a three-mode surge absorber of a public electric power according to the present invention assure that no leakage occurs as it is destroyed in all modes. Besides, herein, the metal oxide varistor is taken as an example of the first and second surge absorbing devices of the present invention, however, the surge absorbing device, such as a gas tube, a transient voltage suppressor or sidactor, etc. serves in the present invention. Especially, the three-end fuses 50 and 80 are not limited to a structure of three ends, it is only for the sake of convenience.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit for indicating abnormality of a three-mode surge absorber of a public electric power serially connected to an input and an output end of a public power supply, said input end having a line input end, a neutral input end, and a ground input end; said output end including a line output end, a neutral output end, and a ground output end for indicating abnormalities of a three-mode surge absorber f a public electric power completely; said circuit for indicating abnormality of a three-mode surge absorber of a public electric power comprising:
   a) a first two-end fuse having a first end coupled to said line input end;
   b) a first surge absorbing device coupled to a second end of the first two-end fuse and said neutral input end for absorbing a surge between said line input end and said neutral input end;
   c) a second surge absorbing device coupled to said line input end and said neutral end;
   d) an abnormal indication circuit coupled to said first surge absorbing device, said second surge absorbing device and said neutral input end for indicating abnormalities in three-mode of a public power supply wherein said abnormal indication circuit includes:
      i) a diode having an anode coupled to a line output end;
      ii) a first resistor having a first end coupled to a cathode of said diode;
      iii) a second resistor having a first end coupled to said second end of said first resistor and a second surge absorbing device;

iv) a first transistor having a base coupled to said second end of said second resistor, and having an emitter coupled to said ground input end;

v) a third resistor having a first end coupled to said cathode of said diode;

vi) a fourth resistor having a first end coupled to said first resistor, a first end of said third resistor, and said cathode of said diode, and having a second end coupled to said collector of said first transistor;

vii) a fifth resistor having a first end coupled to said second end of said fourth resistor and said collector of said first transistor;

viii) a second transistor having a base coupled to said second end of said fifth resistor, and having a collector coupled to said second end of said third resistor;

ix) a surge protection indicating having an anode coupled to said emitter of said second transistor, and having a cathode coupled to said neutral output end; and x) a Zener diode having a cathode coupled to said collector of said second transistor, and having an anode coupled to said neutral output end; and, e) a second two-end fuse having a first end coupled to said second surge absorbing device, and a second end coupled to said ground input end.

2. The circuit for displaying abnormality of a three-mode surge absorber of a public electric power as claimed in claim 1, wherein said first surge absorbing device includes:

a two-end temperature sensing fuse having a first end coupled to said second end of said first two-end fuse, and having a second end coupled to said abnormal indication circuit and said line output end; and a surge absorber having a first end coupled to said second end of said two-end temperature sensing fuse, and having a second end coupled to said neutral input end.

3. The circuit for displaying abnormality of a three-mode surge absorber of a public electric power as claimed in claim 2 wherein the first and second surge absorbers are selected from a group consisting of metal oxide varistor, gas tube, transient voltage suppresser and sidactor.

4. The circuit for displaying abnormality of a three-mode surge absorber of a public electric power as claimed in claim 1, wherein said second surge absorbing device includes:

a first surge absorber having a first end coupled to said line input end, and having a second end coupled to said abnormal indication circuit;

a second surge absorber having a first end coupled to said neutral input end, and having a second end coupled to said abnormal indication circuit; and a two-end temperature sensing fuse having a first end coupled to said second ends of said first and second surge absorbers, and having a second end coupled to said first end of said second two-end fuse.

5. The circuit for displaying abnormality of a three-mode surge absorber of a public electric power as claimed in claim 1, wherein said abnormal indication circuit includes a surge protection indicator.

6. The circuit for displaying abnormality of a three-mode surge absorber of a public electric power as claimed in claim 5, wherein said surge protection indicator is a light emitting diode.

* * * * *